US007149311B2

(12) United States Patent
MacKenzie et al.

(10) Patent No.: US 7,149,311 B2
(45) Date of Patent: Dec. 12, 2006

(54) METHODS AND APPARATUS FOR PROVIDING NETWORKED CRYPTOGRAPHIC DEVICES RESILIENT TO CAPTURE

(75) Inventors: Philip D. MacKenzie, Maplewood, NJ (US); Michael Kendrick Reiter, Raritan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1048 days.

(21) Appl. No.: 10/072,331

(22) Filed: Feb. 7, 2002

(65) Prior Publication Data

US 2002/0141594 A1 Oct. 3, 2002

Related U.S. Application Data

(60) Provisional application No. 60/274,762, filed on Mar. 9, 2001, provisional application No. 60/267,258, filed on Feb. 8, 2001.

(51) Int. Cl.
*H04L 9/00* (2006.01)

(52) U.S. Cl. ............ 380/286; 380/277; 713/168; 713/171; 713/180; 726/18; 726/19; 726/26; 726/30

(58) Field of Classification Search .............. None
See application file for complete search history.

(56) References Cited

U.S. PATENT DOCUMENTS 5,535,276 A     7/1996  Ganesan
5,557,678 A     9/1996  Ganesan
5,588,061 A    12/1996  Ganesan et al.
5,737,419 A     4/1998  Ganesan
5,748,735 A     5/1998  Ganesan
5,838,792 A    11/1998  Ganesan
5,905,799 A     5/1999  Ganesan
6,151,676 A *  11/2000  Cuccia et al. ............... 713/176
6,173,400 B1*   1/2001  Perlman et al. ............. 713/172
6,226,618 B1*   5/2001  Downs et al. ................ 705/1
6,317,729 B1*  11/2001  Camp et al. ................. 705/79
6,490,680 B1*  12/2002  Scheidt et al. ............. 713/166

OTHER PUBLICATIONS

Ivan, Anca, et al, 'Proxy Cryptography Revisited', Dept. of CS, Courant Inst. of Mathematical Sciences, NY Univ., 2003, entire document, www.isoc.org/isoc/conferences/ndss/03/proceedings/papers/14.pdf.*

* cited by examiner

*Primary Examiner*—Ayaz Sheikh
*Assistant Examiner*—Ronald Baum

(57) ABSTRACT

Techniques are provided by which a device that performs private key operations (e.g., signatures or decryptions) in networked applications, and whose local private key is activated with, for example, a password or PIN, can be immunized to offline dictionary attacks in case the device is captured. The techniques do not assume tamper resistance of the device, but rather exploit the networked nature of the device, in that the device's private key operations are performed using a simple interaction with a remote server. This server, however, is untrusted, i.e., its compromise does not reduce the security of the device's private key unless the device is also captured, and need not have a prior relationship with the device. Techniques are also provided for supporting key disabling, by which the rightful owner of a stolen device can disable the device's private key even if the attacker already knows the user's password.

33 Claims, 4 Drawing Sheets

FIG. 3

| dvc | svr |
|---|---|

302 — abort if valid($c$) = 0
304 — $\beta \leftarrow h(\pi)$
306 — $\rho \leftarrow_R \{0,1\}^{\lambda+2|q|}$
308 — $\gamma \leftarrow E_{pk_{svr}}(<c, \beta, \rho>)$
310 — $\delta \leftarrow mac_\alpha(<\gamma, \tau>)$ 312 — $\gamma, \delta, \tau \rightarrow$ 314 — $<a,b,u,p,q,g,x_2> \leftarrow D_{sk_{svr}}(\tau)$
316 — abort if $mac_\alpha(\gamma,\tau) \neq \delta$
318 — $<c, \beta, \rho> \leftarrow D_{sk_{svr}}(\gamma)$
320 — abort if $\beta \neq b \lor$ valid($c$) = 0
322 — $w \leftarrow select(c)$
324 — $v \leftarrow w^{x_2} \mod p$
326 — $r \leftarrow_R Z_q$
328 — $v' \leftarrow w^r \mod p$
330 — $e \leftarrow h_{zkp}(<v, v', g^r \mod p>)$
332 — $s \leftarrow x_2 e + r \mod q$
334 — $\eta \leftarrow \rho \oplus <v, e, s>$ 336 — $\leftarrow \eta$ 338 — $<v, e, s> \leftarrow \rho \oplus \eta$
340 — $w \leftarrow select(c)$
342 — abort if $e \neq h_{zkp}(<v, w^s v^{-e} \mod p, g^s (y_2)^{-e} \mod p>)$
344 — $x_1 \leftarrow f(v, \pi)$
346 — $\mu \leftarrow w^{x_1} \mod p$
348 — return reveal $<v\mu \mod p, c>$

US 7,149,311 B2

METHODS AND APPARATUS FOR PROVIDING NETWORKED CRYPTOGRAPHIC DEVICES RESILIENT TO CAPTURE

CROSS REFERENCE TO RELATED APPLICATIONS

This application claims priority to the U.S. provisional patent application identified by Ser. No. 60/267,258, filed on Feb. 8, 2001, and entitled "Networked Cryptographic Devices Resilient to Capture;" and to the U.S. provisional patent application identified by Ser. No. 60/274,762, filed on Mar 9, 2001, and entitled "Networked Cryptographic Devices Resilient to Capture," the disclosures of which are incorporated by reference herein.

FIELD OF THE INVENTION

The present invention relates to cryptography and, more particularly, to techniques for providing networked cryptographic devices which are resilient to capture.

BACKGROUND OF THE INVENTION

A computing device that performs cryptographic signatures and/or decryptions using the private key of a public key pair, and that stores the private key locally on stable storage, is typically vulnerable to exposure of that private key if the device is captured. While encryption of the private key under a password is common, the ease with which passwords succumb to offline dictionary attacks implies that better protections are needed. Many such protections have been proposed, but most require tamper-resistance of the device. Others used in practice replace the password with a stronger key stored on another device that the user holds, thus moving the burden of protection to that device. Some of these existing approaches will now be discussed.

One existing approach proposes methods to encrypt a DSA (Digital Signature Algorithm) or RSA (Rivest-Shamir-Adleman) private key using a password so that guesses at the password cannot be verified by an attacker who captures the device holding that private key, see, e.g., D. N. Hoover et al., "Software Smart Cards via Cryptographic Camouflage," 1999 IEEE Symposium on Security and Privacy, pp. 208–215, May 1999, the disclosure of which is incorporated by reference herein. However, this feature comes at a severe price. For example, the device's public key must be kept secret, even from the device itself. Obviously, this is because when the attacker learns the public key, he can then verify a successfully decrypted private key. So, the public key must be hidden from all but a few trusted servers that verify signatures produced by the device or encrypt messages for the device. Also, with this approach, it is essential that no verifiable plaintext be encrypted, since this, too, could be used to verify guesses at the password. However, these are awkward constraints to be imposed on a cryptographic system.

Another existing approach proposes simply not storing the device's private key on the device, but rather having the device download the private key from the server when needed, see, e.g., R. Perlman et al., "Secure Password-based Protocol for Downloading a Private Key," Proceedings of the 1999 Network and Distributed System Security Symposium, February 1999, the disclosure of which is incorporated by reference herein. In this approach, to ensure that the private key is downloaded only to the user's device, the device first proves it has been given the user's password. For this purpose there are numerous published protocols by which the device can authenticate to and exchange a key with a server using a password input by its user, without exposing that password to offline dictionary attacks.

Some of these protocols require the device to already have a public key for the server, see, e.g., T. M. A. Lomas et al., "Reducing Risks from Poorly Chosen Keys," ACM Operating Systems Review, 23(5):14–18, December 1989; S. Halevi et al., "Public-key Cryptography and Password Protocols," ACM Conference on Computer and Communications Security, pp. 122–131, 1998; W. Ford et al., "Server-assisted Generation of a Strong Secret from a Password," IEEE International Workshop on Enterprise Security, 2000, the disclosures of which are incorporated by reference herein.

Some of these protocols do not require the device to already have a public key for the server, see, e.g., S. M. Bellovin et al., "Encrypted Key Exchange: Password-based Protocols Secure Against Dictionary Attacks," 1992 IEEE Symposium on Security and Privacy, pp. 72–84, 1992; D. Jablon, "Strong Password-only Authenticated Key Exchange," ACM Computer Communication Review 26(5): 5–20, 1996, T. Wu, "The Secure Remote Password Protocol," 1998 Network and Distributed System Security Symposium, February 1999; M. Bellare et al., "Authenticated Key Exchange Secure Against Dictionary Attacks," Advances in Cryptology—EUROCRYPT 2000, Lecture Notes in Computer Science 1807, pp. 139–155, 2000; V. Boyko et al., "Provably Secure Password Authentication and Key Exchange Using Diffie-Hellman," Advances in Cryptology—EUROCRYPT 2000, Lecture Notes in Computer Science 1807, pp. 156–171, 2000; and P. MacKenzie et al., "Password Authenticated Key Exchange Based on RSA," Advances in Cryptology—ASIACRYPT 2000, pp. 599–613, 2000, the disclosures of which are incorporated by reference herein.

Since the device stores at most only public information, its capture is of no consequence. On the other hand, in all of these protocols, the server either knows the user's password or else can mount an offline dictionary attack against it.

More importantly, when these protocols are used for the retrieval of a private key from the server, the private key (which would most likely be encrypted with the password) would be exposed to the server after a successful offline dictionary attack on the password.

Other existing approaches resort to multiple servers and require that, at most, some threshold number of these servers cooperate in a dictionary attack, see, e.g., the above-referenced W. Ford et al. approach. But this means that some server must be trusted. Also, such existing approaches do not address the possibility that an attacker already knows the user's password or guesses it quickly. Once the attacker guesses the password and downloads the private key, the attacker can use it for an unlimited time.

Still another existing approach to such a cryptographic security problem is to ensure that the private key cannot be used to sign messages dated before the device was captured. This is achieved by "forward secure" signature schemes, which intuitively change the private key (but not the public key) over time so that the captured private key can be used to sign messages only dated in the future, see, e.g., M. Bellare et al., "A Forward-secure Digital Signature Scheme," Advances in Cryptology—CRYPTO '99, Lecture Notes in Computer Science 1666, pp. 431–438, 1999; and H. Krawczyk, "Simple Forward-secure Signatures From Any Signature Scheme," ACM Conference on Computer and Communication Security, pp. 108–115, November 2000, the disclosures of which are incorporated by reference herein. However, such an approach does not prevent any future signatures by the attacker once the device is captured, but rather permits them in a limited way.

If the device can sense that its private key is about to be discovered, as might be possible if the device is a coprocessor with tamper detection circuitry, then another alternative is for the device to change the private key when it detects a pending compromise so that future signatures subliminally disclose to an authority receiving those signatures that the device has been compromised, see, e.g., J. H åstad et al., "Funkspiel Schemes: An Alternative to Conventional Tamper Resistance," ACM Conference on Computer and Communications Security, pp. 125–133, November 2000, the disclosure of which is incorporated by reference herein. However, such an approach also does not prevent any future signatures by the attacker once the device is captured, but rather permits them in a way that subliminally alerts an authority.

Yet other existing approaches employ "server aided protocols," whereby the computational burden of a secret cryptographic computation is moved from the device to a more powerful server. Some of these protocols place trust in the server and thus expose the device's private information to the server, see, e.g., N. Asokan et al., "Server-Supported Signatures," Journal of Computer Security 5(1), 1997; and D. Dean et al., "Cryptography as a Network Service," 2001 ISOC Symposium on Network and Distributed System Security, February 2001, the disclosures of which are incorporated by reference herein. While others of these protocols attempt to hide the private key from the server but nevertheless have the server do the bulk of the computation, see, e.g., T. Matsumoto et al., "Speeding up Computation with Insecure Auxiliary Devices," Advances in Cryptology— CRYPTO '88, Lecture Notes in Computer Science 403, pp. 497–506, 1989; P. Béguin et al., "Fast Server-Aided RSA Signatures Secure Against Active Attacks," Advances in Cryptology—CRYPTO '95, Lecture Notes in Computer Science 963, pp. 57–69, 1995; and S. Hong et al., "A New Approach to Server-aided Secret Computation," $1^{st}$ International Conference on Information Security and Cryptology, pp. 33–45, 1998, the disclosures of which are incorporated by reference herein. However, such server aided protocols attempt to reduce the computation required of the user's device rather than attempting to render the device impervious to an offline dictionary attack once captured.

Thus, there exists a need for techniques which overcome drawbacks associated with existing cryptographic approaches and which thereby make networked cryptographic devices more resilient to capture.

SUMMARY OF THE INVENTION

The present invention provides techniques by which a device that performs private key operations (e.g., signatures or decryptions) in networked applications, and whose local private key is activated with, for example, a password or personal identification number (PIN), can be immunized to offline dictionary attacks in case the device is captured. The techniques do not assume tamper-resistance of the device, but rather exploit the networked nature of the device, in that the device's private key operations are performed using a simple interaction with a remote server. This server, however, is untrusted, i.e., its compromise does not reduce the security of the device's private key unless the device is also captured, and need not have a prior relationship (e.g., pre-registration process) with the device.

For instance, in one aspect of the invention, a technique for use in a device associated with a first party (e.g., client device) for performing a key retrieval operation comprises the following steps. The first party device generates a request for the partial assistance of a device associated with a second party (e.g., server) in recovering a key from data stored on the first party device. The second party device is remote from the first party device. The request is transmitted from the first party device to the second party device. Then, the first party device receives results generated by the second party device based on the partial assistance provided by the second party device. At least a portion of the received results are used in the first party device to recover the key for subsequent use as a private key in one or more associated public key cryptographic techniques (e.g., decryption or signature operations).

The key may have a piece of secret information (e.g., password, PIN) associated therewith which is included in the request. The partial assistance may be provided by the second party device when a verification is made by the second party device, based on the piece of secret information, that the first party sent the request.

Further, the request generated by the first party device may comprise cryptographic information included in the data stored on the first party device and previously generated from the key. This cryptographic information is referred to herein as a "ticket." The cryptographic information or ticket may be generated via an encryption operation which is a function of one or more pieces of secret information (e.g., password, PIN) associated with the first party, the key, and a public key associated with the second party device.

Still further, the results generated by the second party device may comprise results associated with the second party device partially decrypting at least a portion of the cryptographic information or ticket in the request. Then, the step of using at least a portion of the received results in the first party device may further comprise completing the decryption of at least a portion of the cryptographic information to recover the key. The first party device may at least temporarily store or cache the recovered key.

The inventive techniques are further extended with support for key disabling, by which the rightful owner of a stolen device can disable the device's private key even if the attacker already knows the user's password.

For instance, in another aspect of the invention, a technique for use in a device associated with a first party (e.g., client device) for performing a private key operation associated with one or more public key cryptographic techniques comprises the following steps. The first party device generates a request for the partial assistance of a device associated with a second party (e.g., server) in performing a private key operation using a private key associated with data stored on the first party device. The second party device is remote from the first party device. The request is transmitted from the first party device to the second party device. Then, the first party device receives results generated by the second party device based on the partial assistance provided by the second party device. At least a portion of the received results are used in the first party device to perform the private key operation.

Then, in order to disable the private key operation, the first party device (or some other party or entity, or the first party from some other device) may then request the second party device to ignore a subsequent request to perform partial assistance for a private key operation. The request to ignore subsequent requests may be authenticated by the second party device.

The data stored on the first party device may have a piece of secret information (e.g., password, PIN) associated therewith, which is included in the request. Then, the partial assistance may be provided by the second party device when a verification is made by the second party device, based on the piece of secret information, that the first party sent the request.

Further, the step of sharing the performance of the private key operation may comprise a function sharing operation. The data stored on the first party device may have been constructed by generating a first share and a second share of a private key associated with the first party device.

Still further, the data stored on the first party device may comprise an encryption of at least the second share of the private key in accordance with a public key associated with the second party device so as to generate cryptographic information (or ticket). The request generated in the first party device may comprise the cryptographic information.

Additionally, the step of using at least a portion of the received results in the first party device to perform the private key operation may comprise completing a computation of the private key operation at the first party device using results of a computation portion contributed by the second party device.

It is to be understood that while the private key operation may comprise many types of decryption operations, it may preferably comprise an ElGamal protocol. Similarly, while the private key operation may comprise many types of signature operations, it may preferably comprise an RSA protocol.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a flow diagram illustrating a protocol with key disabling in accordance with a second embodiment of the present invention.

DETAILED DESCRIPTION OF THE PREFERRED EMBODIMENTS

Figure 1:
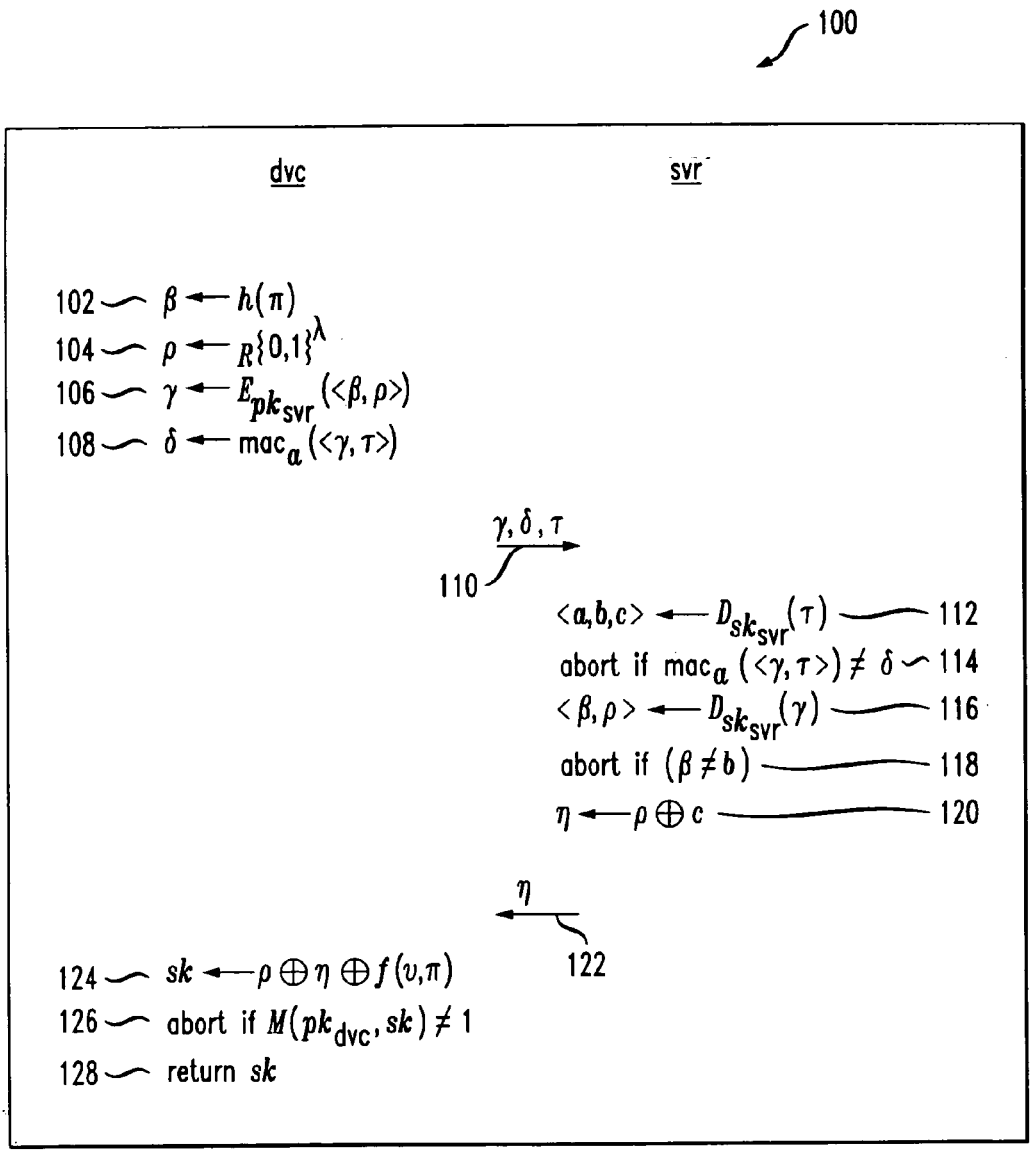
FIG. 1 is a flow diagram illustrating a key retrieval protocol in accordance with an embodiment of the present invention.

The present invention provides techniques to render the private key of a networked device invulnerable to offline dictionary attacks, even if the device is captured. The techniques exploit the fact that the device has network connectivity at the time it is required to perform a private key operation, and thus can interact with a remote party (e.g., remote server) at that time to complete the operation. This is characteristic of virtually any device involved in an interactive authentication or key exchange protocol.

By way of example and without limitation, it is to be understood that a "device" may include any type of computing system that may be employed in a networked environment, e.g., a personal computer (including desktops and laptops), a personal digital assistant (PDA), a smartcard, a cellular phone, etc. Likewise, by way of example and without limitation, a "server" may also be any type of computing system that may be employed in a networked environment. Thus, it is to be understood that the protocols of the invention may be implemented between any two parties or entities.

The present invention preferably exploits network connectivity by employing a remote server that assists the device in performing its private key operation. This remote server need not have any preexisting relationship with, or knowledge of, the device (though the device needs a public key for the server). Moreover, the server is untrusted. That is, the server, even if it misbehaves, gains no information that would help it to compute signatures that verify with the device's public key or to decrypt messages encrypted under the device's public key. The only behavior that is preferred of the server is that it executes the correct protocol to respond to a well-formed request, and that it stop responding to invocations pertaining to a device's public key (e.g., for a period of time) after it has received sufficiently many malformed requests associated with this public key. This latter behavior is preferred in order to prevent an "online" dictionary attack against the password. We note, however, that this feature does not present a denial-of-service vulnerability, since in the protocols of the invention, an attacker can conduct an online dictionary attack only after it has captured the device, thus, use of the device by the legitimate user is presumably already denied.

The present invention provides two types of protocols that achieve the above properties. These types functionally differ on whether they enable the device's private key to be disabled. If the device is stolen, it is natural for the device's rightful owner to wish to disable the use of the private key, to account for the possibility that the attacker already knows the user's password (e.g., by observing the user type it) or can guess it in very few tries (e.g., due to his intimate knowledge of the user).

In the key disabling type of protocol of the invention, the user can issue a request to the server to disable future use of the private key associated with the device's public key. Once the server receives this request and verifies it is well-formed, the device's key is rendered useless to the attacker, even if the attacker knows the user's password. The attacker will thus be unable to employ the key in future interactive protocols or to decrypt future encrypted messages. This feature is especially useful if revocation of the device's public key via a public key infrastructure (e.g., a certificate revocation list) has an associated delay (if it exists at all). In contrast, using the protocols of the invention advantageously permits the private key to be disabled immediately.

Advantageously, protocols of the invention that do not provide key disabling are compatible with any public key cryptosystem or signature scheme in use by the device, and any protocol using them. Protocols of the invention supporting key disabling depend on the type of private key operations in use.

The present invention presumes a system with a device (referred to as "dvc") and a server (referred to as "svr") that communicate by exchanging messages over a public network. An example of such an arrangement will be described below in the context of FIG. 4. In the protocols of the invention, the device is used either for generating signatures or decrypting messages (i.e., private key operations), and does so by interacting with the server. The signature or decryption operation is password-protected, by a password $\pi_0$. The system is initialized with public data, secret data for the device, secret data for the user of the device (i.e., $\pi_0$), and secret data for the server. The public and secret data associated with the server may simply be a certified public key and associated private key, respectively, which is set up well before the device is initialized.

The device-server protocols of the invention allow a device operated by a legitimate user (i.e., one who knows $\pi_0$) to sign or decrypt a message with respect to the public key of the device, after communicating with the server. In those protocols supporting key disabling, device initialization may create additional secret data that, if sent to the server, will cause the server to no longer execute the decryption or signing protocol with that device.

Each adversary considered is presumed to control the network; i.e., the attacker controls any inputs to dvc or svr, and observes their outputs. Moreover, an adversary can "capture" certain resources. The possible resources that may be captured by the attacker are dvc, svr, and $\pi_0$. Once captured, the entire static contents of the resource become known to the attacker. The one restriction on the adversary is that if he captures dvc, then he does so after dvc initialization and while dvc is in an inactive state, i.e., dvc is not presently executing the protocol with $\pi_0$ as input, and that $\pi_0$ is not subsequently input to the device by the user. This decouples the capture of dvc and $\pi_0$ and is consistent with a motivation that dvc is captured while not in use by the user and, once captured, is unavailable to the user.

We denote by ADV(S), where $S \subseteq \{dvc, svr, \pi_0\}$ the class of adversaries who succeed in capturing the elements of S. As such, $ADV(S_1) \subseteq ADV(S_2)$ if $S_1 \subseteq S_2$. Thus, some security goals of the inventive protocols may be informally stated as follows:

I. Any adversary in ADV ($\{svr, \pi_0\}$) is unable to forge signatures or decrypt messages for the device (with overwhelming probability).

II. Any adversary in ADV ($\{dvc\}$) can forge signatures or decrypt messages for the device with probability at most q/|A| after q invocations of the server, where A is the space from which the user's password is drawn (uniformly at random).

III. Any adversary in ADV ($\{dvc, svr\}$) can forge signatures or decrypt messages for the device only if it succeeds in an offline dictionary attack on the user's password.

IV. Any adversary in ADV ($\{dvc, \pi_0\}$) can forge signatures or decrypt messages for the device only until the device key is disabled (in those schemes supporting key disabling), and subsequently cannot forge signatures or decrypt messages for the device.

Before explaining the protocols of the invention, we first introduce some definitions and notations which will be used in accordance with their explanations.

Security parameters. Let $\kappa$ be the main cryptographic security parameter; a reasonable value today may be $\kappa=160$. We will use $\lambda > \kappa$ as a secondary security parameter for public keys. For instance, in an RSA public key scheme, we may set $\lambda=1024$ to indicate that we use 1024-bit moduli.

Hash functions. We use h, with an additional subscript as needed, to denote a hash function. Unless otherwise stated, the range of a hash function is $\{0, 1\}^\kappa$. It is generally preferred that these hash functions behave like random oracles, see, e.g., M. Bellare et al., "Random Oracles Are Practical: A Paradigm for Designing Efficient Protocols," ACM Conference on Computer and Communications Security, pp. 62–73, November 1993, the disclosure of which is incorporated by reference herein. However, hash functions with weaker properties may be employed.

Keyed hash functions. A keyed hash function family is a family of hash functions $\{f_v\}$ parameterized by a secret value v. We will typically write $f_v(m)$ as $f(v,m)$. We also use a specific type of keyed hash function, a message authentication code (MAC). We denote a MAC family as $\{mac_a\}$. We do not require MACs to behave like random oracles, but to have the following standard property: if a is unknown, then given zero or more pairs $<m_i, mac_a(m_i)>$, it is computationally infeasible to compute any pair $<m, mac_a(m)>$ for any new $m \neq m_i$.

Encryption schemes. An encryption scheme $\epsilon$ is a triple ($G_{enc}$, E, D) of algorithms, the first two being probabilistic, and all running in expected polynomial time. $G_{enc}$ takes as input $1^\lambda$ and outputs a public key pair (pk, sk), i.e., (pk, sk)$\leftarrow G_{enc}(1^\lambda)$. E takes a public key pk and a message m as input and outputs an encryption c for m; we denote this c$\leftarrow E_{pk}(m)$. D takes a ciphertext c and a secret key sk as input and returns either a message m such that c is a valid encryption of m, if such an m exists, and otherwise returns $\perp$.

It is preferred that an encryption scheme be secure against adaptive chosen ciphertext attacks, see, e.g., C. Rackoff et al., "Non-interactive Zero-knowledge Proof of Knowledge and Chosen Ciphertext Attack," Advances in Cryptology—CRYPTO '91, pp. 433–444, 1991, the disclosure of which is incorporated by reference herein. Other examples can be found in M. Bellare et al., "Optimal Asymmmetric Encryption," Advances in Cryptology—EUROCRYPT '94, Lecture Notes in Computer Science 950, pp. 92–111, 1995; and R. Cramer et al., "A Practical Public Key Cryptosystem Provably Secure Against Adaptive Chosen Ciphertext Attack," Advances in Cryptology—CRYPTO '98, Lecture Notes in Computer Science 1462, pp. 13–25, 1998, the disclosures of which are incorporated by reference herein.

Signature schemes. A digital signature scheme S is a triple ($G_{sig}$, S, V) of algorithms, the first two being probabilistic, and all running in expected polynomial time. $G_{sig}$ takes as input $1^\lambda$ and outputs a public key pair (pk, sk), i.e., (pk, sk)$\leftarrow G_{sig}(1^\lambda)$. S takes a message m and a secret key sk as input and outputs a signature $\sigma$ for m, i.e., $\sigma \leftarrow S_{sk}(m)$. V takes a message m, a public key pk, and a candidate signature $\sigma'$ for m as input and returns the bit b=1 if $\sigma'$ is a valid signature for m, and otherwise returns the bit b=0. That is, b$\leftarrow V_{pk}(m,\sigma')$. Naturally, if $\sigma \leftarrow S_{sk}(m)$, then $V_{pk}(m,\sigma)=1$.

We say a signature scheme is "matchable" if for each public key pk produced by $G_{sig}(1^\lambda)$ there is a single secret key sk that would be produced (i.e., the probability of (pk, sk)$\leftarrow G_{sig}(1^\lambda)$ and (pk, sk')$\leftarrow G_{sig}(1^\lambda)$ with sk$\neq$sk' is zero), and there is a probabilistic algorithm M that runs in expected polynomial time and that takes as input a public key pk and a secret key sk, and returns 1 if sk is the single private key corresponding to pk (i.e., if $G_{sig}(1^\lambda)$ could have produced (pk sk) with non-zero probability) and returns 0 otherwise. In existing signature schemes with which the invention may be employed, implementation of the M function is well-known and straightforward. "Matchable" encryption schemes are defined similarly.

1. Protocol Without Key Disabling

The key retrieval protocol of the invention achieves goals I, II, and III described above. Since this protocol remains the same regardless of whether the device is used to decrypt or sign, herein below we discuss the protocol using terminology as if the device is used for signing. This scheme is parameterized by the device's signature scheme S and an encryption scheme $\epsilon$ for the server (when speaking about security of this and later protocols against offline dictionary attack, we also include a parameter A to denote a dictionary of the possible passwords), and works independently of the form of S and $\epsilon$. We thus also refer to this key retrieval protocol herein as "generic," i.e., the generic protocol.

At device initialization time, the private key of the device is encrypted in a way that can be recovered only with the cooperation of both the device (if it is given the user's password) and the server. This ciphertext, called a "ticket," also embeds other information that enables the server to authenticate requests that accompany the ticket as coming from a device that has been given the user's password. When the device is required to perform an operation with its private key, it sends the ticket to the server. The device accompanies the ticket with evidence of its knowledge of the user's password. The server can check this evidence against information in the ticket. The server then performs a transformation on the ticket to "partially decrypt" it, and returns the result to the device. The device completes the decryption to recover its private key. The device may then use the private key for performing the required operations, and may even cache the key in volatile memory for some period of time so that additional operations can be performed without contacting the server for each one.

If an attacker captures the device and guesses the user's password (i.e., the adversary is in ADV ({dvc, $\pi_0$})), then it can retrieve the private key and keep it forever. Limiting the damage an attacker can do in this case requires assistance from some external mechanism for revoking the device's public key, if such a mechanism exists.

In the following two subsections, details of the steps of the initialization algorithm and the key retrieval protocol (or generic protocol) are provided.

1.1 Device Initialization

The inputs to device initialization are the server's public encryption key $pk_{svr}$, the user's password $\pi_0$, the device's public signature verification key $pk_{dvc}$, and the corresponding private signing key $sk_{dvc}$. The steps of the initialization algorithm proceed as follows, where "$z \leftarrow_R S$" is used to denote assignment to z of an element of S selected uniformly at random:

$v \leftarrow_R \{0,1\}^\kappa$ $a \leftarrow_R \{0,1\}^\kappa$ $b \leftarrow h\{\pi_0\}$ $c \leftarrow f(v,\pi_0) \oplus sk_{dvc}$ $\tau \leftarrow E_{pk_{svr}}(<a,b,c>)$ The symbol $\leftarrow$ generally refers to an assignment of the computation results of the right hand side of the expression to the value or parameter of the left hand side of the expression. The operator $\oplus$ represents the exclusive-OR (XOR) operation. The values v, a, $\tau$, $pk_{dvc}$, and $pk_{svr}$ are saved in stable storage on the device. All other values, including $sk_{dvc}$, $\pi_0$, b and c, are deleted from the device. It is assumed that $f$ outputs a value of length equal to the length of $sk_{dvc}$. For the generic protocol, it is assumed this length is $\lambda$.

The value $\tau$ is the previously referred to "ticket." Note that this ticket encapsulates a value c from which the device can recover $sk_{dvc}$ with knowledge of the user's password. The server's role in the key retrieval protocol thus involves decrypting this ticket and sending c to the device (encrypted). Note that c does not provide the basis for the server to mount an attack against $sk_{dvc}$, since the server does not know v.

1.2 Key Retrieval Protocol

Referring now to FIG. 1, a flow diagram illustrates the steps of a key retrieval (or generic) protocol 100 according to an embodiment of the present invention. In accordance with FIG. 1, steps shown on the left side of the figure are performed by the device (dvc), and steps shown on the right side of the figure are performed by the remote server (svr). The arrows passing between the device and server represent communication between them.

The input provided to the device to initiate the key retrieval protocol is the input password $\pi$ and all of the values saved on stable storage in the initialization protocol described above in subsection 1.1. It is to be understood that we denote $\pi_0$ as the actual user's password, and $\pi$ the password input to the protocol (which may be different, especially if the attacker is trying to run the protocol). The protocol by which the device retrieves $sk_{dvc}$ is thus depicted in FIG. 1.

In step 102, the device computes $\beta$, which is an authenticator that proves knowledge of $\pi$ to the server. As previously explained, h represents an appropriate hash function. In step 104, the device computes $\rho$, which acts as a one-time pad by which the server encrypts c to return it to the device. In step 106, the device computes $\gamma$, which is an encryption (using the public key of the server) of $\beta$ and $\rho$ to securely transport them to the server.

In step 108, the device computes the value $\delta$ as a function of $\gamma$ and $\tau$, which is a message authentication code that is generated from the MAC key a stored on the device, and that the server uses to confirm that this request actually originated from the device.

Though $\delta$ is not required to prove security of this protocol, it nevertheless is important in practice since it enables the server to distinguish requests bearing $\tau$ but not originating from the device (i.e., $mac_a(<\gamma, \tau>) \neq \delta$), from requests bearing $\tau$ that originate from the device but for which the device's knowledge of the user's password cannot be verified (i.e., $\beta \neq b$). The latter category may indicate an online dictionary attack, and accordingly the ticket $\tau$ should be ignored (e.g., for some period of time) after sufficiently many such requests. The former type should not "count against" $\tau$, however, since they do not pose a risk to the password; indeed, the authenticator $\beta$ is never checked in these cases. On the contrary, if this former category were treated like the latter, then this would enable a denial-of-service attack on $\tau$ (i.e., the device) in which an attacker, having seen $\tau$ pass on the network, submits requests to the server containing $\tau$ and random values for $\gamma$ and $\delta$.

Next, in step 110, the device transmits the values $\gamma$, $\delta$ and $\tau$ to the server.

Upon receipt of these values, the server decrypts the ticket $\tau$ in order to recover values a, b and c, in step 112. In step 114, the server uses $\gamma$, $\delta$ and $\tau$ to confirm that this request for a private key actually originated from the device. Thus, if $mac_a(<\gamma, \tau>) \neq \delta$, then the server aborts the private key retrieval operation. In step 116, the server decrypts $\gamma$ in order to recover values $\beta$ and $\rho$. In step 118, the server determines whether it is in receipt of a request that bears $\tau$ and originated from the device but that is a request for which the device's knowledge of the user's password cannot be verified. Thus, if $\beta \neq b$, then the server aborts the private key retrieval operation.

Assuming the operation is not terminated in step 114 or 116, the server then computes parameter η by performing an exclusive-OR operation between ρ and c, in step 120. Thus, in effect through steps 112 through 120, the server performs a transformation on the ticket to "partially decrypt" the ticket. In step 122, the server transmits the result η to the device.

In step 124, the device computes its private key sk by performing exclusive-OR operations between ρ, η and $f(v, \pi)$. Thus, in effect through step 124, the device completes the decryption to recover its private key. In step 126, the device determines whether its public key and its computed private key are matched, as explained above. Thus, if M ($pk_{dvc}$, sk)≠1, then the key retrieval operation is aborted. Assuming the key pair is matched, the protocol 100 returns (outputs) sk as the device's private key, in step 128. The device may then use the private key for performing the required operations (e.g., signing and decrypting).

It is important for security that the device delete β, ρ and, of course, sk when it is done with them, so that none of these values are available to an attacker who subsequently captures the device. In particular, these values are preferably never stored on stable storage on the device to ensure, e.g., that they will disappear from the device if the device crashes. However, the device may cache the private key sk in volatile memory for some period of time so that additional operations can be performed without contacting the server for each additional operation.

Brief intuition for the security of this protocol is as follows. First, goal I is achieved due to the encryption of $sk_{dvc}$ by $f(v, \pi_0)$, since an adversary in ADV ({svr, $\pi_0$}) does not knowv. Goal II is achieved since the only way an adversary in ADV ({dvc}) gains information about the password is by submitting guesses at β (or rather, β's resulting from guesses at the password) to the server. Finally, even an adversary in ADV ({dvc, svr}) is required to conduct an offline dictionary attack against the password to discover $sk_{dvc}$, since $sk_{dvc}$ is encrypted using $f(v, \pi_0)$.

2. Protocols With Key Disabling

In this section, protocols of the invention which support key disabling are explained. It is to be appreciated that such protocols satisfy all of the goals (I–IV) described above, including the ability for the user to disable the private key of the device even after the attacker has captured the device and guessed the user's password. As is evident, the reason that key disabling is not implemented in the generic protocol, described above in section 1, is that the device's private key is recovered by the device as part of that protocol. As a result, an attacker who captures the device and guesses the user's password can recover the private key and use it indefinitely.

In order to make key disabling possible, the present invention provides protocols in which the private key is never recovered by the device. Rather, the device performs each signature or decryption operation individually by interacting with the server. This is achieved by 2-out-of-2 function sharing, where the function being shared is the device's signature or decryption function. More precisely, when the device is initialized, two "shares" of the device's private key are generated. The first share is constructed so that it can be generated from the user's password and information stored on the device. The second share, plus other data for authenticating requests from the device, are encrypted under $pk_{svr}$ to form the device's ticket. Both shares are then deleted from the device. In the device's signature or decryption protocol, the device sends its ticket plus evidence that it was given the user's password, the server verifies this using information in the ticket, and then the server contributes its portion of the computation using its share. Together with the device's contribution using its share (generated from the user's password), the signature or decryption can be formed.

Disabling the private key $sk_{dvc}$ is achieved by requesting that the server permanently ignore the device's ticket. Once this is done, further queries by the attacker—specifically, any adversary in ADV ({dvc,$\pi_0$})—will not yield further signatures or decryptions. Of course, to prevent a denial-of-service attack against the device even without it being stolen, requests to disable the device's ticket must be authenticated. The protocols of the invention provide this feature as well. It can be proven that the protocols of the invention meet all of the above-mentioned goals in the random oracle model.

The feature of key disabling generally depends on the particular decryption/signature protocol in which it is implemented. For example, in the signature protocol illustrated herein for the RSA signature protocol, the server learns the message m being signed. It is therefore important that m be public information if the server is untrusted. This requirement is consistent with signatures in TLS 1.0 (see, e.g., T. Dierks et al., "The TLS Protocol Version 1.0," IETF Request for Comments 2246, January 1999, the disclosure of which is incorporated by reference herein), for example, since in that protocol, parties sign only public information. Second, due to the use of function sharing in the protocols of the invention, they are generally dependent on the particular signature or decryption algorithm in use. In the following subsections, we describe protocols for RSA signatures and ElGamal decryption, though the techniques of the invention generalize to many other signature and decryption schemes, e.g., RSA decryption protocol, Schnorr signature protocol, DSA protocol (in which case there is more than one request/answer exchange between dvc and svr, e.g., request1/answer1/request2/answer2), etc.

2.1 S-RSA: A Protocol for RSA Signatures

In this subsection, it is presumed that the device signs using a standard encode-then-sign RSA signature algorithm (e.g., "hash-and-sign" as described in D. E. Denning, "Digital Signatures with RSA and Other Public-key Cryptosystems," Communications of the ACM 27(4):388–392, April 1984, the disclosure of which is incorporated by reference herein) as described below.

Accordingly, we refer to this protocol as S-RSA. The public key of the device is $pk_{dvc}$=<e,N> and the secret key is $sk_{dvc}$=<d,N,φ(N)>, where ed≡$_{φ(N)}$1, N is the product of two large prime numbers, and φ is the Euler totient function. The notation≡$_{φ(N)}$ means equivalence modulo φ(N). The device's signature on a message m is defined as follows, where 'encode' is the encoding function associated with S, and $κ_{sig}$ denotes the number of random bits used in the encoding function (e.g., $κ_{sig}$=0 for a deterministic encoding function):

$S_{<d,N,φ(N)>}(m): r \leftarrow_R \{0,1\}^{κ_{sig}}$
$s \leftarrow (encode(m,r))^d \mod N$
return<s,r>

Here, the signature is σ=<s,r>, though it may not be necessary to include r if it can be determined from m and s. We remark that "hash-and-sign" is an example of this type of signature in which the encoding function is simply a deterministic hash of m, and that PSS (as described in M. Bellare et al., "The Exact Security of Digital Signatures—How to Sign with RSA and Rabin, Advances in Cryptology—EUROCRYPT '96, Lecture Notes in Computer Science 1070, pp. 399–416, 1996, the disclosure of which is incorporated by reference herein) is another example of this type of signature with a probabilistic encoding.

Both of these types of signatures were proven secure against adaptive chosen message attacks in the random oracle model. Naturally any signature of this form can be verified by checking that $S^e \equiv_N$ encode (m, r). In the function sharing primitive used in the inventive protocol, d is broken into shares $d_1$ and $d_2$ such that $d_1+d_2 \equiv_{100 \ (N)} d$.

2.1.1 Device Initialization

The inputs to device initialization are the server's public encryption key $pk_{svr}$, the user's password $\pi_0$, the device's public key $pk_{dvc}=<e,N>$, and the corresponding private key $sk_{dvc}=<d,N,\phi(N)>$. The initialization algorithm proceeds as follows:

$t \leftarrow_R \{0,1\}^\kappa$ $u \leftarrow h_{dsbl}(t)$ $v \leftarrow_R \{0,1\}^\kappa$ $a \leftarrow_R \{0,1\}^\kappa$ $b \leftarrow h(\pi_0)$ $d_1 \leftarrow f(v,\pi_0)$ $d_2 \leftarrow d-d_1 \bmod \phi(N)$ $\tau \leftarrow E_{pk_{svr}}(<a,b,u,d_2,N>)$ Here, we assume that $f$ outputs an element of $\{0, 1\}^{\lambda+\kappa}$. The values t, v, a, $\tau$, $pk_{dvc}$, and $pk_{svr}$ are saved on stable storage in the device. All other values, including u, b, d, $d_1$, $d_2$, $\phi(N)$, and $\pi_0$, are deleted from the device. The values t and $\tau$ should be backed up offline for use in disabling if the need arises. The value $\tau$ is the device's "ticket" that it uses to access the server.

2.1.2 Signature Protocol

This subsection illustratively explains the protocol by which the device signs a message m in accordance with the invention. The input provided to the device for this protocol is the input password $\pi$, the message m, and all of the values saved on stable storage in the initialization protocol of subsection 2.1.1.

Figure 2:
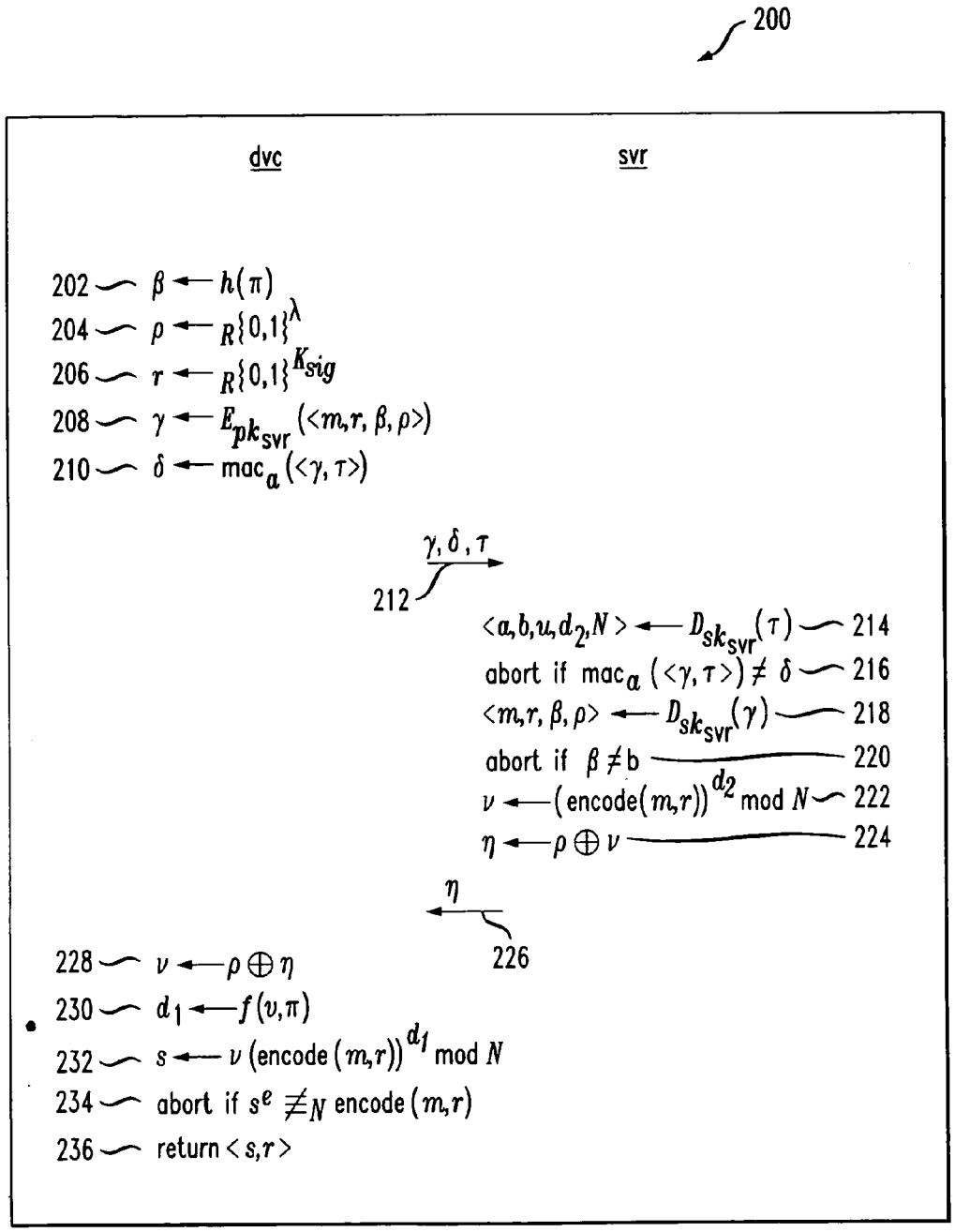
FIG. 2 is a flow diagram illustrating a protocol with key disabling in accordance with a first embodiment of the present invention.

Referring now to FIG. 2, a flow diagram illustrates a protocol 200 with key disabling in accordance with a first embodiment of the present invention, i.e., the S-RSA protocol. In step 202, the device computes β, which is a value that proves the device's knowledge of $\pi$ to the server. The device computes ρ in step 204, which is a one-time pad by which the server encrypts v to return it to the device. The value r is a $\kappa_{sig}$-bit value used in the 'encode' function and is computed in step 206. The value γ is computed in step 208 and represents an encryption of m, r, β and ρ in order to securely transport them to the server.

In step 210, δ is computed by the device and represents a message authentication code computed using a. This value shows the server that this request originated from the device. As in section 1 above, δ is not necessary to prove security relative to the above-mentioned goals, but nevertheless is important in practice to prevent denial-of-service attacks. It is important that the device delete β, $d_1$, and ρ when the protocol completes, and to never store them on stable storage.

Next, in step 212, the device transmits the values γ, δ and $\tau$ to the server.

Upon receipt of these values, the server decrypts the ticket $\tau$ in order to recover values a, b and u, $d_2$ and N in step 214. In step 216, the server uses γ, δ and $\tau$ to confirm that this request for a private key actually originated from the device. Thus, if $mac_a(<\gamma, \tau>) \neq \delta$, then the server aborts the private key retrieval operation. In step 218, the server decrypts γ in order to recover values m, r, β and ρ. In step 220, the server determines whether it is in receipt of a request that bears $\tau$ and originated from the device but that is a request for which the device's knowledge of the user's password cannot be verified. Thus, if $\beta \neq b$, then the server aborts the private key retrieval operation.

Assuming the operation is not terminated in step 216 or 220, the server computes v in step 222 using the 'encode' function m, r, $d_2$ (the server's share of d) and N. In step 224, the server then computes parameter η by performing an exclusive-OR operation between ρ and v. In step 226, the server transmits the result η to the device.

In step 228, the device computes parameter v by performing an exclusive-OR operation between ρ and η. The device computes $d_1$ (its share of d) in step 230 as $f(v, \pi)$. In step 232, the device computes the signature s using the 'encode' function m, r, $d_1$ and N. The signature is verified in step 234, and returned (outputted) in step 236.

Suppose that the device has been stolen, and that the user wishes to permanently disable the private key of the device. Provided that the user backed up t and $\tau$ before the device was stolen, the user can send t, $\tau$ to the server. Upon recovering $<a, b, u, d_2, N> \leftarrow D_{sk_{svr}}(\tau)$, the server verifies that $u=h_{dsbl}(t)$ and, if so, records $\tau$ on a disabled list. Subsequently, the server should refuse to respond to any request containing the ticket $\tau$. This requires that the server store $\tau$ (or a hash of it) on a "blacklist." Rather than storing $\tau$ forever, though, the server can discard $\tau$ once there is no danger that $pk_{dvc}$ will be used subsequently (e.g., once the public key has been revoked). Note that for security against denial-of-service attacks (an adversary attempting to disable $\tau$ without t), $h_{dsbl}$ need not be a random oracle, but simply a one-way hash function.

The intuition behind the security of this protocol is similar to that for the generic protocol. The major difference, however, is that only the server's contribution v to the signature of m is returned to the device, not $sk_{dvc}$ (or the server's share of it). This is what makes key disabling possible.

The efficiency of the S-RSA protocol may generally be worse than the signing efficiency of the underlying RSA signature scheme, not only because of the message and encryption costs, but also because certain optimizations (e.g., Chinese remaindering) that are typically applied for RSA signatures cannot be applied in S-RSA. Nevertheless, since dvc can compute (encode $(m,r))^{d_1}$ mod N while awaiting a response from svr, a significant portion of the device's computation can be parallelized with the server's computation.

2.2 D-ELG: A Protocol for ElGamal Decryption

In this subsection, a protocol of the invention by which the device can perform decryption with an ElGamal (as described in T. ElGamal, "A Public Key Cryptosystem and a Signature Scheme Based on Discrete Logarithms," IEEE Transactions on Information Theory, 31:469–472, 1985, the disclosure of which is incorporated by reference herein) private key, using the techniques described herein to gain the same benefits as S-RSA signatures yielded for RSA signatures. The focus here is on decryption (versus signatures), and ElGamal (versus RSA), to demonstrate the breadth of cryptographic operations to which the inventive techniques apply.

For ElGamal encryption, the public and private keys of the device are $pk_{dvc}=<g,p,q,y>$ and $sk_{dvc}=<g,p,q,x>$, respectively, where p is an $\lambda$-bit prime, g is an element of order q in $Z^*_p$, x is an element of $Z_q$ chosen uniformly at random, and $y=g^x$ mod p. For generality, we describe the D-ELG protocol using an abstract specification of "ElGamal-like" encryption. An "ElGamal-like" encryption scheme is an encryption scheme in which: (i) the public and private keys are as above; and (ii) the decryption function D can be expressed in the following form:

$D_{<g,p,q,x>}(c)$: abort if valid(c)=0
    $w \leftarrow$ select(c)
    $z \leftarrow w^x$ mod p
    $m \leftarrow$ reveal(z,c)
    return m Above, valid(c) tests the well-formedness of the ciphertext c; it returns 1 if well-formed and 0 otherwise. The expression select(c) returns the argument w that is raised to the x-th power modulo p. The expression reveal(z, c) generates the plaintext m using the result z of that computation. For example, in original ElGamal encryption, where $q=p-1$ and $c=<c_1, c_2>=<g^k$ mod p, $my^k$ mod p> for some secret value $k \in Z_q$, valid $(<c_1, c_2>)$ returns 1 if $c_1, c_2 \in Z^*_p$ and 0 otherwise; select $(<c_1, c_2>)$ returns $c_1$; and reveal $(z, <c_1, c_2>)$ returns $c_2 z^{-1}$ mod p. It is to be noted, however, that the private key is not an argument to 'valid,' 'select,' or 'reveal;' rather, the private key is used only in computing z. Using this framework, the D-ELG protocol is described in the following subsections.

2.2.1 Device Initialization

The inputs to device initialization are the server's public encryption key $pk_{svr}$, the user's password $\pi_0$, the device's public key $pk_{dvc}=<g,p,q,y>$, and the corresponding private key $sk_{dvc}=<g,p,q,x>$. The initialization algorithm proceeds as follows:

$t \leftarrow_R \{0,1\}^\kappa$ $u \leftarrow h_{dsbl}(t)$ $v \leftarrow_R \{0,1\}^\kappa$ $a \leftarrow_R \{0,1\}^\kappa$ $b \leftarrow h(\pi_0)$ $x_1 \leftarrow f(v, \pi_0)$ $x_2 \leftarrow x - x_1$ mod q $y_2 \leftarrow g^{x_2}$ mod p $\tau \leftarrow E_{pk_{svr}}(<a,b,u,g,p,q,x_2>)$ Here, we assume that $f$ outputs an element of $\{0,1\}^{2|q|}$. The values v, a, $y_2$, $\tau$, $pk_{dvc}$, $pk_{svr}$ and t are saved on stable storage in the device. All other values, including u, b, x, $x_1$, $x_2$, and $\pi_0$, are deleted from the device. The values t and $\tau$ should be backed up offline for use in disabling if the need arises. The value $\tau$ is the device's ticket that it uses to access the service.

2.2.2 Decryption Protocol

Referring now to FIG. 3, a flow diagram illustrates a protocol 300 with key disabling in accordance with a second embodiment of the present invention, i.e., the D-ELG protocol. More specifically, FIG. 3 illustrates a protocol by which the device decrypts a ciphertext c generated using the device's public key in an ElGamal-like encryption scheme. The input provided to the device for this protocol is the input password $\pi$, the ciphertext c, and all of the values saved on stable storage in the initialization protocol of subsection 2.2.1 above. In this protocol, $h_{zkp}$ is assumed to return an element of $Z_q$.

In step 302, the well-formedness of the ciphertext c is tested by the device. If the function valid(c) returns a zero, the decryption protocol is aborted. If the function valid(c) returns a one, the decryption protocol continues on to the next steps. As before, the device computes $\beta$ in step 304, which is a value that proves the device's knowledge of $\pi$ to the server. The device computes $\rho$ in step 306. As before, $\rho$ is a one-time pad by which the server encrypts certain values (in this case, v, e, s) to return them to the device after performing its share of the decryption operations. In step 308, the device computes $\gamma$, which is an encryption of c, $\beta$, and $\rho$, to securely transport these values to the server. In step 310, the device also computes value $\delta$, which is a message authentication code computed using a, to show the server that this request originated from the device.

Next, in step 312, the device transmits the values $\gamma$, $\delta$ and $\tau$ to the server.

Upon receipt of these values, the server decrypts the ticket $\tau$ in order to recover values a, b, u, p, q, g and $x_2$ in step 314. As before, in step 316, the server uses $\gamma$, $\delta$ and $\tau$ to confirm that this request for a private key actually originated from the device. Thus, if $mac_a(<\gamma,\tau>) \neq \delta$, then the server aborts the decryption operation. In step 318, the server decrypts $\gamma$ in order to recover values c, $\beta$ and $\rho$. In step 320, the server determines whether it is in receipt of a request that bears $\tau$ and originated from the device, but that it is a request for which the device's knowledge of the user's password cannot be verified. Thus, if, $\beta \neq b$, then the server aborts the decryption operation.

In step 322, the expression select(c) returns the argument w that is then raised to the x-th power modulo p in step 324. The values r and v' are computed by the server in steps 326 and 328, respectively. Then, in step 330, values v, v', $g^r$ mod p are hashed using function $h_{zkp}$ in order to generate e. The value s is then computed by the server in step 332. In step 334, the server then computes parameter $\eta$ by performing an exclusive-OR operation between $\rho$ and v, e and s. In step 336, the server transmits the result $\eta$ to the device.

In step 338, the device computes values v e and s by performing an exclusive-OR operation between $\rho$ and $\eta$. The device, in step 340 (like step 322 at the server), computes w using select(c). In step 342, a check is made to confirm that the returned value of e is consistent with the hash function $h_{zkp}$. If it is not, then the decryption operation is aborted. Assuming the operation is not terminated, in step 344, the device computes $x_1$ as $f(v, \pi)$. The value $\mu$ is computed in step 346 as $w^{x_1}$ mod p. Then, in step 348, the reveal expression generates the plaintext m using $v\mu$, p and c.

Thus, it is to be understood that the device's decryption function is implemented jointly by dvc and svr in accordance with the D-ELG protocol. Moreover, <ve,s> constitutes a non-interactive zero-knowledge proof from svr (the "prover") to dvc (the "verifier") that svr constructed its contribution v correctly.

Decryption via the D-ELG protocol may be somewhat more costly than decryption in the underlying ElGamal-like encryption scheme. As in S-RSA, it is preferred that dvc compute μ while awaiting a response from svr in order to parallelize computation between the two.

Like S-RSA, the D-ELG protocol also supports key disabling. Assuming that the user backed up t and τ before the device was stolen, the user can send t, τ to the server. Upon recovering $<a,b,u,g,p,q,x_2> \leftarrow D_{sk_{svr}}(\tau)$, the server verifies that $u=h_{dsbl}(t)$ and, if so, records τ on a disabled list. Subsequently, the server should refuse to respond to any request containing the ticket τ. This requires the server to store τ (or a hash of it) on a "blacklist." Rather than storing τ forever, though, the server can discard τ once there is no danger that $pk_{dvc}$ will be used subsequently (e.g., once the public key has been revoked).

There are several implementations for ElGamal-like encryption schemes that, when used to instantiate the description of FIG. 3, result in a protocol that provably satisfies the above-mentioned goals I–IV.

The precise senses in which a particular instance can satisfy goal IV will now be discussed. The most natural definition of security for key disabling is that an adversary in ADV ({dvc, $\pi_0$}) who is presented with a ciphertext c after the key has been disabled will be unable to decrypt c. A stronger definition for key disabling could require that c remain indecipherable even if c were given to the adversary before key disabling occurred, as long as c were not sent to svr before disabling.

If the original ElGamal scheme is secure against indifferent chosen ciphertext attacks, then the protocol of FIG. 3 can be proven secure in the former sense when instantiated with original ElGamal. There are, however, ElGamal-like encryption schemes that suffice to achieve even the latter, stronger security property, such as the following proposal from V. Shoup et al., "Securing Threshold Cryptosystems Against Chosen Ciphertext Attack," Advances in Cryptology—EUROCRYPT '98, pp. 1–16, 1998, the disclosure of which is incorporated by reference herein, called TDH1. In this scheme, q is a κ-bit prime factor of p-1. Encryption of a message m proceeds as follows:

$E_{<g,p,q,y>}(m): k \leftarrow_R Z_q$
$C_1 \leftarrow h_1(y^k \bmod p) \oplus m$
$C_2 \leftarrow g^k \bmod p$
$l \leftarrow_R Z_q$
$g' \leftarrow h_2(<c_1, c_2, g^l \bmod p>)$
$c_3 \leftarrow (g')^k \bmod p$
$c_4 \leftarrow h_{zkp}(<g', c_3, (g')^l \bmod p>)$
$c_5 \leftarrow l + kc_4 \bmod q$ The tuple $<c_1, c_2, c_3, c_4, c_5>$ is the ciphertext. Above, $h_1$ outputs a value from $\{0,1\}^{|m|}$, and $h_2$ outputs an element of the subgroup of $Z^*_p$ generated by g. For example, this can be achieved by defining $h_2(z)=(h'(z))^{(P-1)/q} \bmod p$ for some other hash function h'. Decryption takes the following form:

valid(c): $<c_1, c_2, c_3, c_4, c_5> \leftarrow c$
  $w_1 \leftarrow g^{c_5}(C_2)^{-c_4} \bmod p$
  $g' \leftarrow h_2(<c_1, c_2, w_1>)$
  $w_2 \leftarrow (g')^{c_5}(c_3)^{-c_4} \bmod p$
  return $(c_4 = h_{zkp}(<g', c_3, w_2>))$
select(c): $<c_1, c_2, c_3, c_4, c_5> \leftarrow c$
  return $c_2$
reveal(z,c): $<c_1, c_2, c_3, c_4, c_5> \leftarrow c$
  return $h_1(z) \oplus c_1$ A second proposal from V. Shoup et al., called TDH2, can also be used to instantiate the inventive protocol and achieve the stronger version of goal IV.

Figure 4:
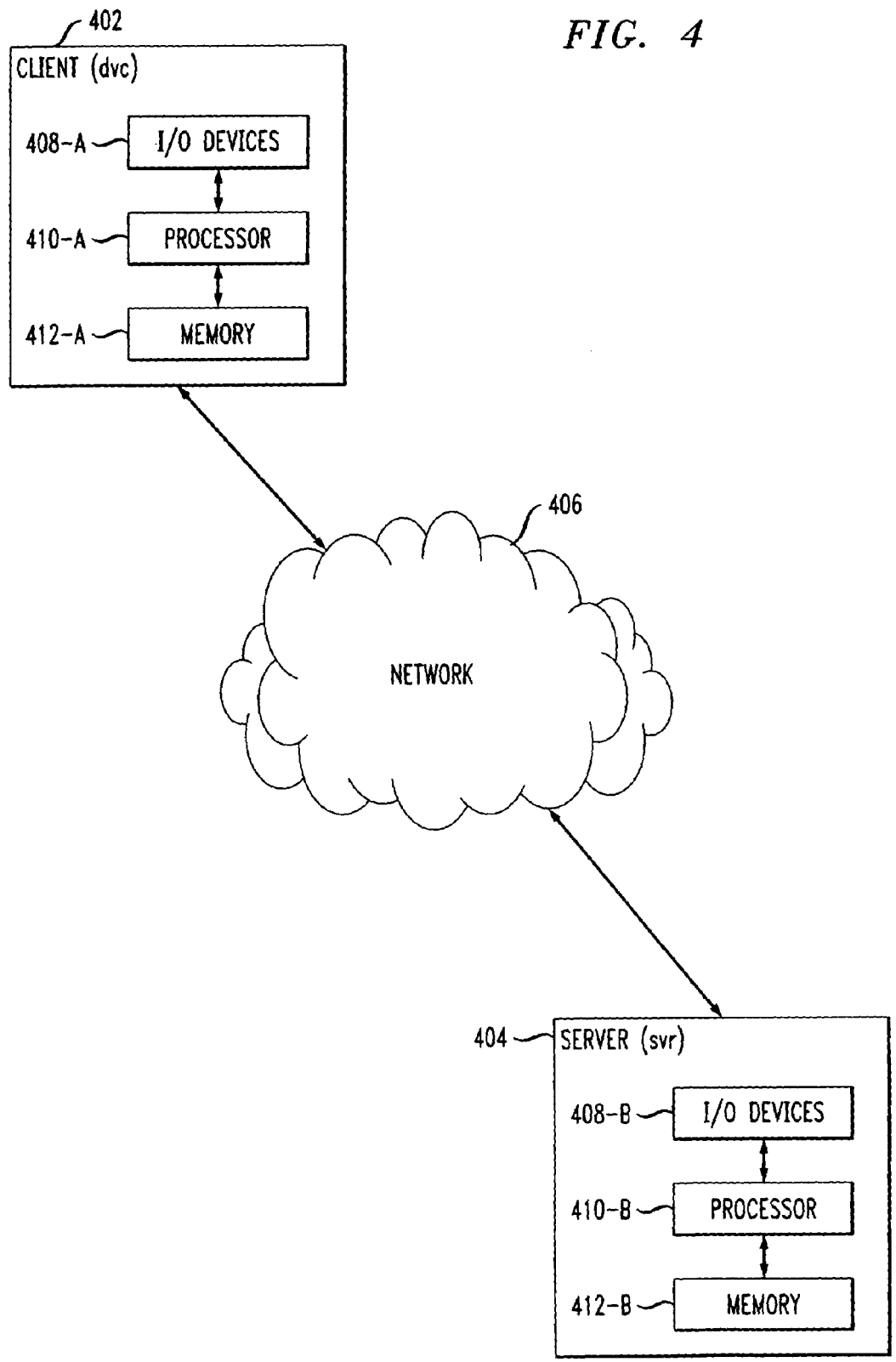
FIG. 4 is a block diagram illustrating a generalized hardware architecture of a data network and computer systems suitable for implementing one or more of the methodologies according to the present invention.

Referring now to FIG. 4, a block diagram illustrates a generalized hardware architecture of a data network and computer systems suitable for implementing key retrieval, signature and decryption protocols between two entities, a client and a remote server, according to the present invention. As shown, the client (e.g., dvc or device as used above in the protocol explanations) comprises a computer system 402, while the server (e.g., svr as used above in the protocol explanations) comprises a computer system 404. The two computer systems 402 and 404 are coupled via a data network 406. The data network may be any data network across which dvc and svr desire to communicate, e.g., the Internet. However, the invention is not limited to a particular type of network. Typically, and as labeled in FIG. 4, dvc is a client machine and svr is a server machine. However, this is not required, and dvc and svr are referred to as client and server, respectively, only as an example to show the typical case. Thus, it is to be understood that the protocols of the present invention are not limited to the case where dvc and svr are client and server, respectively, but instead is applicable to any computing devices comprising dvc and svr.

As is readily apparent to one of ordinary skill in the art, the server and client may be implemented as programmed computers operating under control of computer program code. The computer program code is stored in a computer readable medium (e.g., a memory) and the code is executed by a processor of the computer system. Given this disclosure of the invention, one skilled in the art can readily produce appropriate computer program code in order to implement the protocols described herein.

In any case, FIG. 4 generally illustrates an exemplary architecture for each computer system communicating over the network. As shown, the client device comprises I/O devices 408-A, processor 410-A, and memory 412-A. The server system comprises I/O devices 408-B, processor 410-B, and memory 412-B. It should be understood that the term "processor" as used herein is intended to include one or more processing devices, including a central processing unit (CPU) or other processing circuitry. Also, the term "memory" as used herein is intended to include memory associated with a processor or CPU, such as RAM, ROM, a fixed memory device (e.g., hard drive), or a removable memory device (e.g., diskette or CDROM). A portion of this memory may serve as "stable storage," as referred to above. In addition, the term "I/O devices" as used herein is intended to include one or more input devices (e.g., keyboard, mouse) for inputting data to the processing unit, as well as one or more output devices (e.g., CRT display) for providing results associated with the processing unit. Accordingly, software instructions or code for performing the protocols/methodologies of the invention, described herein, may be stored in one or more of the associated memory devices, e.g., ROM, fixed or removable memory, and, when ready to be utilized, loaded into RAM and executed by the CPU.

As explained in detail above, dictionary attacks against password-protected private keys are a significant threat if the device holding those keys may be captured. Accordingly, the present invention provides protocols/methodologies to render devices invulnerable to such attacks. The protocols/methodologies provide for the device to interact with a remote server to perform its private key operations. Therefore, the protocols/methodologies are well-suited to a device that uses its private key in interactive cryptographic protocols (and so necessarily has network connectivity to reach the server when use of its private key is required). A prime example is a device that plays the role of a client in the TLS protocol with client authentication. While the device interacts with a remote server, it can be proven that this server poses no threat to the device. Specifically, the server gains no significant advantage in forging signatures that can be verified with the device's public key or decrypting messages encrypted under the device's public key. In particular, the server cannot mount a dictionary attack to expose the device's private key. Even if both the device and server are compromised, the attacker must still succeed in an offline dictionary attack before signing on behalf of the device.

In addition to the above properties, the present invention provides protocols/methodologies that further provide the feature of key disabling. This enables the user to disable the device's private key immediately, even after the device has been captured and even if the attacker has guessed the user's password. Once disabled, the device's key is provably useless to the attacker (provided that the attacker cannot also compromise the server). Key disabling is thus an effective complement to any public key revocation mechanism that might exist, particularly if there is a delay for revoking public keys.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for use in a device associated with a first party for performing a key retrieval operation, the method comprising the steps of:
    generating in the first party device a request for the partial assistance of a device associated with a second party in recovering a key from data stored on the first party device,
    wherein
        the second party device is remote from the first party device;
    transmitting the request from the first party device to the second party device;
    receiving results in the first party device generated by the second party device based on the partial assistance provided by the second party device; and
    using at least a portion of the received results in the first party device to recover the key for subsequent use as a private key in one or more associated public key cryptographic techniques;
    wherein
        the request generated by the first party device comprises cryptographic information included in the data stored on the first party device and previously generated from the key.

2. The method of claim 1, wherein the first party device is a client device and the second party device is a server.

3. The method of claim 1, wherein the data stored on the first party device has a piece of secret information associated therewith which is included in the request, and further wherein the partial assistance is provided by the second party device when a verification is made by the second party device, based on the piece of secret information, that the first party sent the request.

4. The method of claim 1, wherein
    the cryptographic information is generated via an encryption operation which is a function of one or more pieces of secret information associated with the first party, the key, and
    a public key associated with the second party device.

5. The method of claim 1 wherein
    the results generated by the second party device comprise results associated with the second party device partially decrypting at least a portion of the cryptographic information in the request.

6. The method of claim 5, wherein the step of using at least a portion of the received results in the first party device further comprises completing the decryption of at least a portion of the cryptographic information to recover the key.

7. The method of claim 1, further comprising the step of at least temporarily storing the recovered key at the first party device.

8. The method of claim 1, wherein the one or more associated public key cryptographic techniques comprise decryption or signature operations.

9. The method of claim 1, wherein no pre-registration process need take place between the first party device and the second party device.

10. A method for use in a device associated with a first party for assisting in the performance of a key retrieval operation, the method comprising the steps of:
    receiving a request generating in and transmitted by a second party device for the partial assistance of the first party device in recovering a key from data stored on the second party device,
    wherein
        the first party device is remote from the second party device; and
    generating results in the first party device based on the partial assistance provided thereby for use in the second party device to recover the key for subsequent use as a private key in one or more associated public key cryptographic techniques;
    wherein
        the request generated by the second party device comprises cryptographic information included in the data stored on the second party device and previously generated from the key.

11. The method of claim 10, wherein the first party device is a server and the second party device is a client device.

12. Apparatus for use in a device associated with a first party for performing a key retrieval operation, the apparatus comprising:
    at least one processor operable to:
        (i) generate in the first party device a request for the partial assistance of a device associated with a second party in recovering a key from data stored on the first party device,
        wherein the second party device is remote from the first party device;
        (ii) transmit the request from the first party device to the second party device;
        (iii) receive results in the first party device generated by the second party device based on the partial assistance provided by the second party device; and
        (iv) use at least a portion of the received results in the first party device to recover the key for subsequent use as a private key in one or more associated public key cryptographic techniques; and
    memory, coupled to the at least one processor, for storing at least a portion of results associated with one or more operations performed by the processor,
    wherein
        the request generated by the first party device comprises cryptographic information included in the data stored on the first party device and previously generated from the key.

13. A method for use in a device associated with a first party for performing a private key operation associated with one or more public key cryptographic techniques, the method comprising the steps of:
generating in the first party device a request for the partial assistance of a device associated with a second party in performing a private key operation using a private key associated with data stored on the first party device, wherein
the second party device is remote from the first party device;
transmitting the request from the first party device to the second party device;
receiving results in the first party device generated by the second party device based on the partial assistance provided by the second party device; and
using at least a portion of the received results in the first party device to perform the private key operations;
wherein
the request generated by the first party device comprises cryptographic information included in the data stored on the first party device and previously generated from the key.

14. A method for use in a device associated with a first party for performing a private key operation associated with one or more public key cryptographic techniques, the method comprising the steps of:
generating in the first party device a request for the partial assistance of a device associated with a second party in performing a private key operation using a private key associated with data stored on the first party device, wherein the second party device is remote from the first party device;
transmitting the request from the first party device to the second party device;
receiving results in the first party device generated by the second party device based on the partial assistance provided by the second party device; and
using at least a portion of the received results in the first party device to perform the private key operation;
the second party device receiving a request to ignore a subsequent request to perform the partial assistance for a private key operation in order to disable the private key operation.

15. The method of claim 13, wherein the first party device is a client device and the second party device is a server.

16. The method of claim 13, wherein the data stored on the first party device has a piece of secret information associated therewith which is included in the request, and further wherein the partial assistance is provided by the second party device when a verification is made by the second party device, based on the piece of secret information, that the first party sent the request.

17. The method of claim 14, wherein the request to ignore subsequent requests is authenticated by the second party device.

18. The method of claim 13, wherein the step of sharing the performance of the private key operation comprises a function sharing operation.

19. The method of claim 13, wherein the data stored on the first party device was constructed by generating a first share and a second share of a private key associated with the first party device.

20. The method of claim 19, wherein the first share is constructed so that the share can be generated from a piece of secret information associated with the first party and information stored on the first party device.

21. The method of claim 20, wherein the data stored on the first party device comprises an encryption of at least the second share of the private key in accordance with a public key associated with the second party device so as to generate cryptographic information.

22. The method of claim 20, wherein the request generated in the first party device comprises the cryptographic information.

23. The method of claim 22, wherein the step of using at least a portion of the received results in the first party device to perform the private key operation comprises completing a computation of the private key operation at the first party device using results of a computation portion contributed by the second party device.

24. The method of claim 13, wherein the private key operation comprises a decryption operation.

25. The method of claim 24, wherein the decryption operation comprises an ElGamal protocol.

26. The method of claim 13, wherein the private key operation comprises a signature operation.

27. The method of claim 26, wherein the signature operation comprises an RSA protocol.

28. The method of claim 13, wherein no pre-registration process need take place between the first party device and the second party device.

29. A method for use in a device associated with a first party for assisting in performing a private key operation associated with one or more public key cryptographic techniques, the method comprising the steps of;
receiving a request generating in and transmitted by a second party device for the partial assistance of the first party device in performing a private key operation using a private key associated with data stored on the second party device,
wherein
the first party device is remote from the second party device; and
generating results in the first party device based on the partial assistance provided thereby for use in the second party device to perform the private key operations;
wherein
the request generated by the second party device comprises cryptographic information included in the data stored on the second party device and previously generated from the key.

30. A method for use in a device associated with a first party for assisting in performing a private key operation associated with one or more public key cryptographic techniques, the method comprising the steps of:
receiving a request generating in and transmitted by a second party device for the partial assistance of the first party device in performing a private key operation using a private key associated with data stored on the second party device, wherein the first party device is remote from the second party device; and
generating results in the first party device based on the partial assistance provided thereby for use in the second party device to perform the private key operation;
in response to a request, the first party device ignoring a subsequent request to perform partial assistance for a private key operation in order to disable the private key operation.

31. The method of claim 29, wherein the first party device is a server and the second party device is a client device.

32. Apparatus for use in a device associated with a first party for performing a private key operation associated with one or more public key cryptographic techniques, the apparatus comprising:

at least one processor operable to:
(i) generate in the first party device a request for the partial assistance of a device associated with a second party in performing a private key operation using a private key associated with data stored on the first party device, wherein
the second party device is remote from the first party device;
(ii) transmit the request from the first party device to the second party device;
(iii) receive results in the first party device generated by the second party device based on the partial assistance provided by the second party device; and
(iv) use at least a portion of the received results in the first party device to perform the private key operation; and
memory, coupled to the at least one processor, for storing at least a portion of results associated with one or more operations performed by the processor,
wherein
the request generated by the first party device comprises cryptographic information included in the data stored on the first party device and previously generated from the key.

33. Apparatus for use in a device associated with a first party for performing a private key operation associated with one or more public key cryptographic techniques, the apparatus comprising:

at least one processor operable to: (i) generate in the first party device a request for the partial assistance of a device associated with a second party in performing a private key operation using a private key associated with data stored on the first party device, wherein the second party device is remote from the first party device; (ii) transmit the request from the first party device to the second party device: (iii) receive results in the first party device generated by the second party device based on the partial assistance provided by the second party device; and (iv) use at least a portion of the received results in the first party device to perform the private key operation; and memory, coupled to the at least one processor, for storing at least a portion of results associated with one or more operations performed by the processor;

wherein the second party device receives a request to ignore a subsequent request to perform the partial assistance for a private key operation in order to disable the private key operation.

* * * * *

UNITED STATES PATENT AND TRADEMARK OFFICE
CERTIFICATE OF CORRECTION

| | | |
|---|---|---|
| PATENT NO. | : 7,149,311 B2 | Page 1 of 1 |
| APPLICATION NO. | : 10/072331 | |
| DATED | : December 12, 2006 | |
| INVENTOR(S) | : P.D. MacKenzie et al. | |

It is certified that error appears in the above-identified patent and that said Letters Patent is hereby corrected as shown below:

On the Title Page:

Item (75), second inventor, change "Raritan, NJ" to --Pittsburgh, PA--.

In claim 29, column 22, line 42, change "operations" to --operation--.

Signed and Sealed this

Twentieth Day of February, 2007

JON W. DUDAS
*Director of the United States Patent and Trademark Office*